Feb. 21, 1967    T. J. CRAIG    3,304,720
WATER JET PROPELLED OUTBOARD BOAT MOTOR
Filed Dec. 7, 1964    15 Sheets-Sheet 3

Thomas J. Craig
INVENTOR.

BY *Clarence A. O'Brien*
and *Harvey B. Jackson*
Attorneys

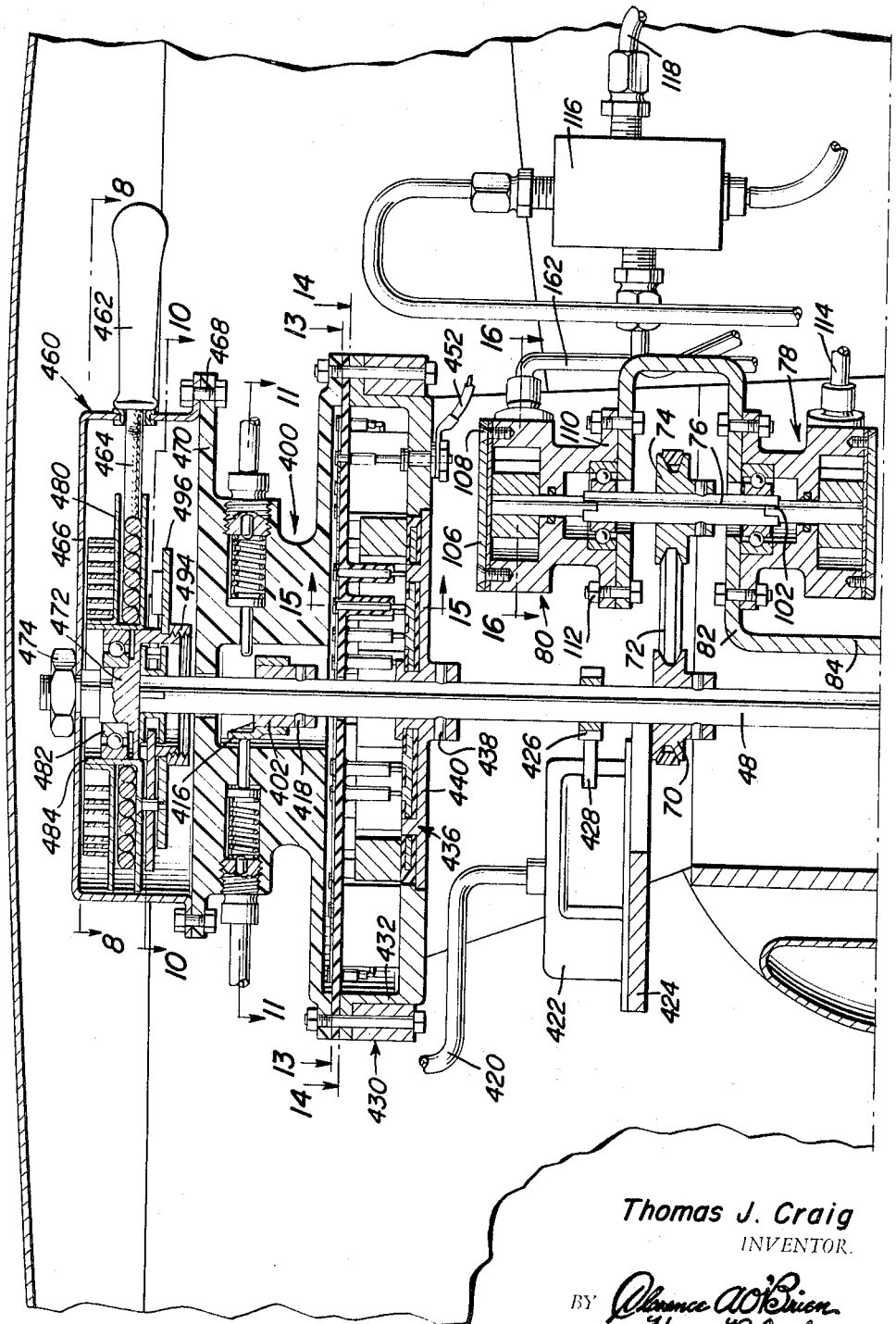

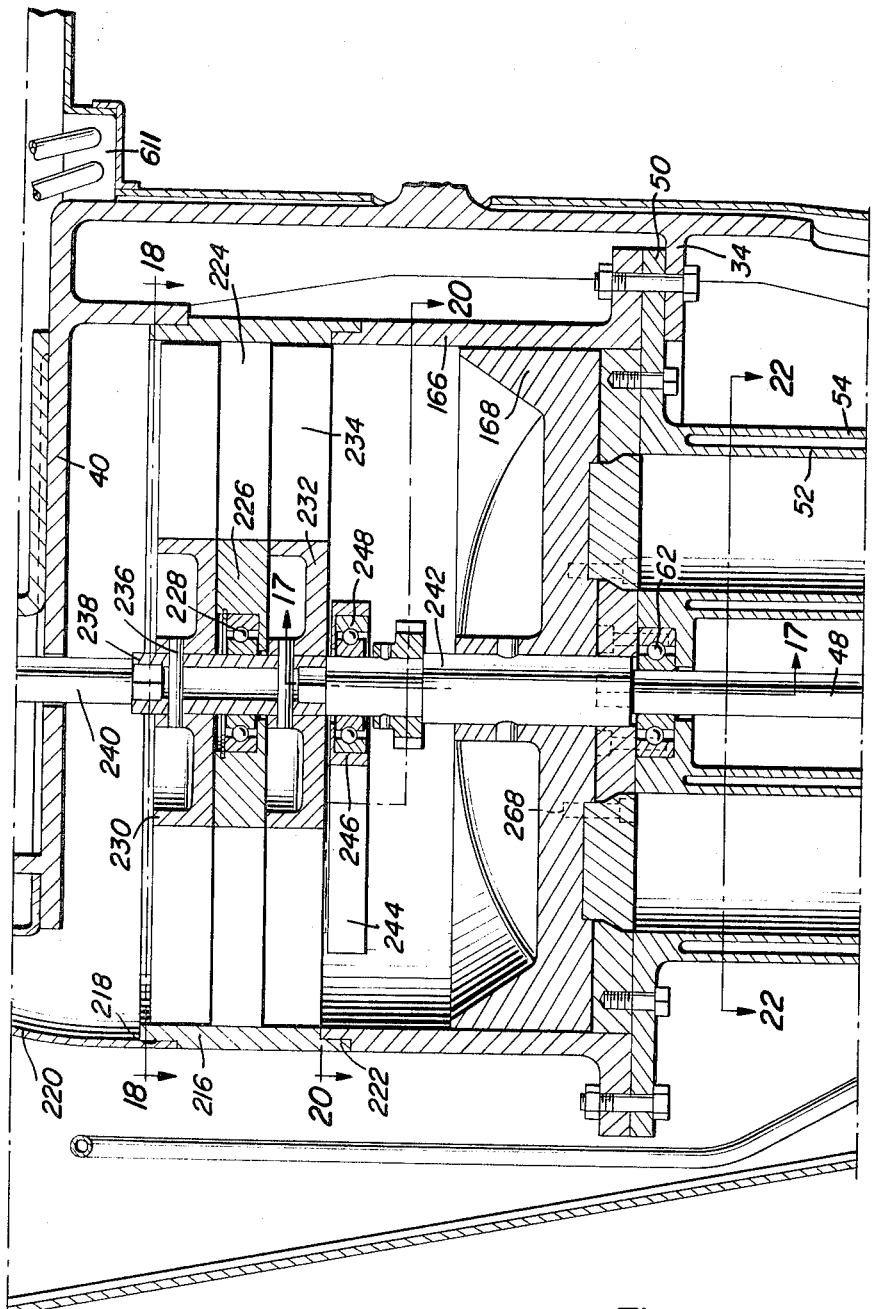

Feb. 21, 1967 T. J. CRAIG 3,304,720
WATER JET PROPELLED OUTBOARD BOAT MOTOR
Filed Dec. 7, 1964 15 Sheets-Sheet 6
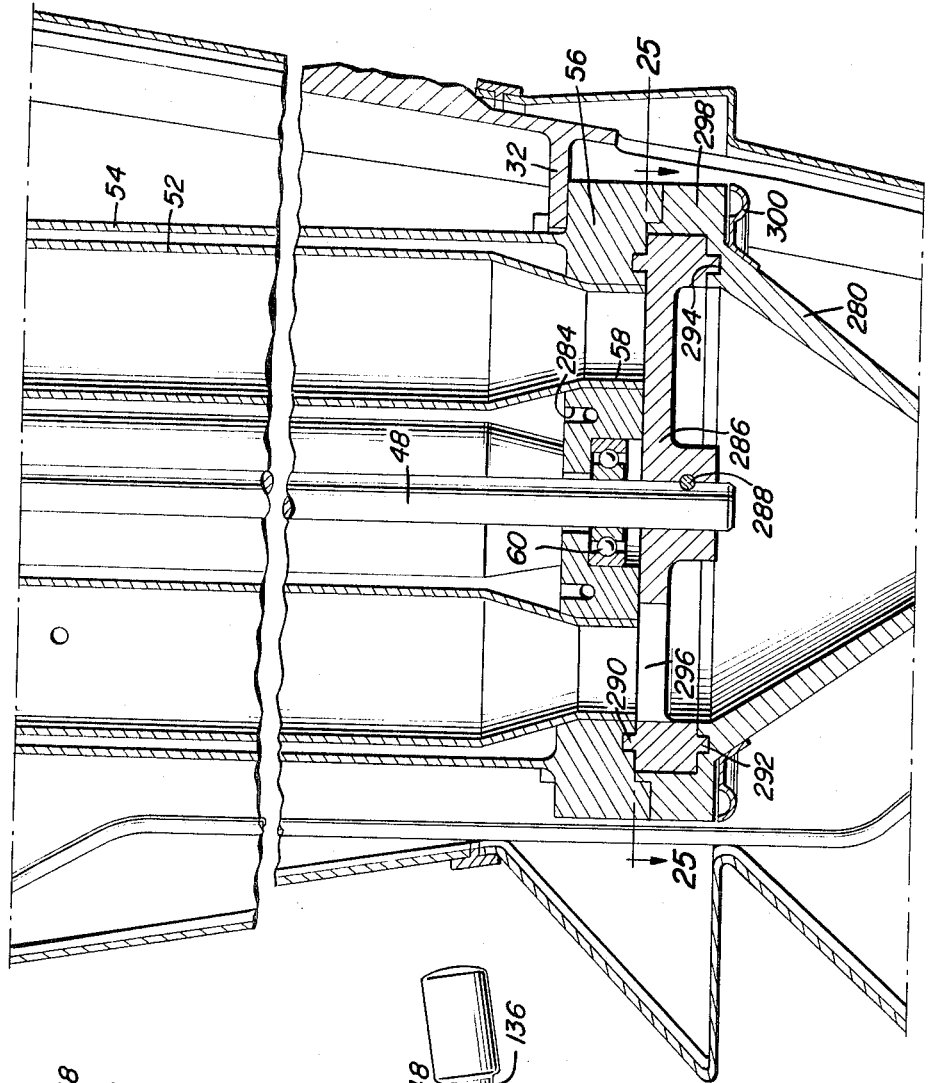
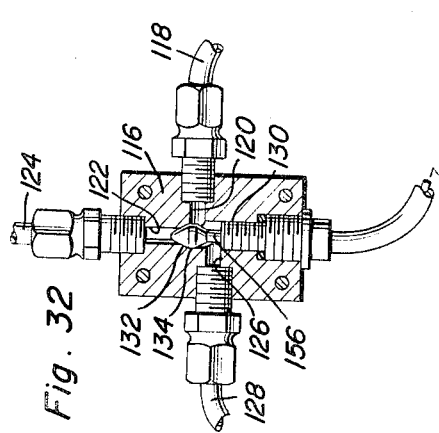
Thomas J. Craig
INVENTOR.
BY Clarence A. O'Brien
and Harvey B. Jacobson
Attorneys

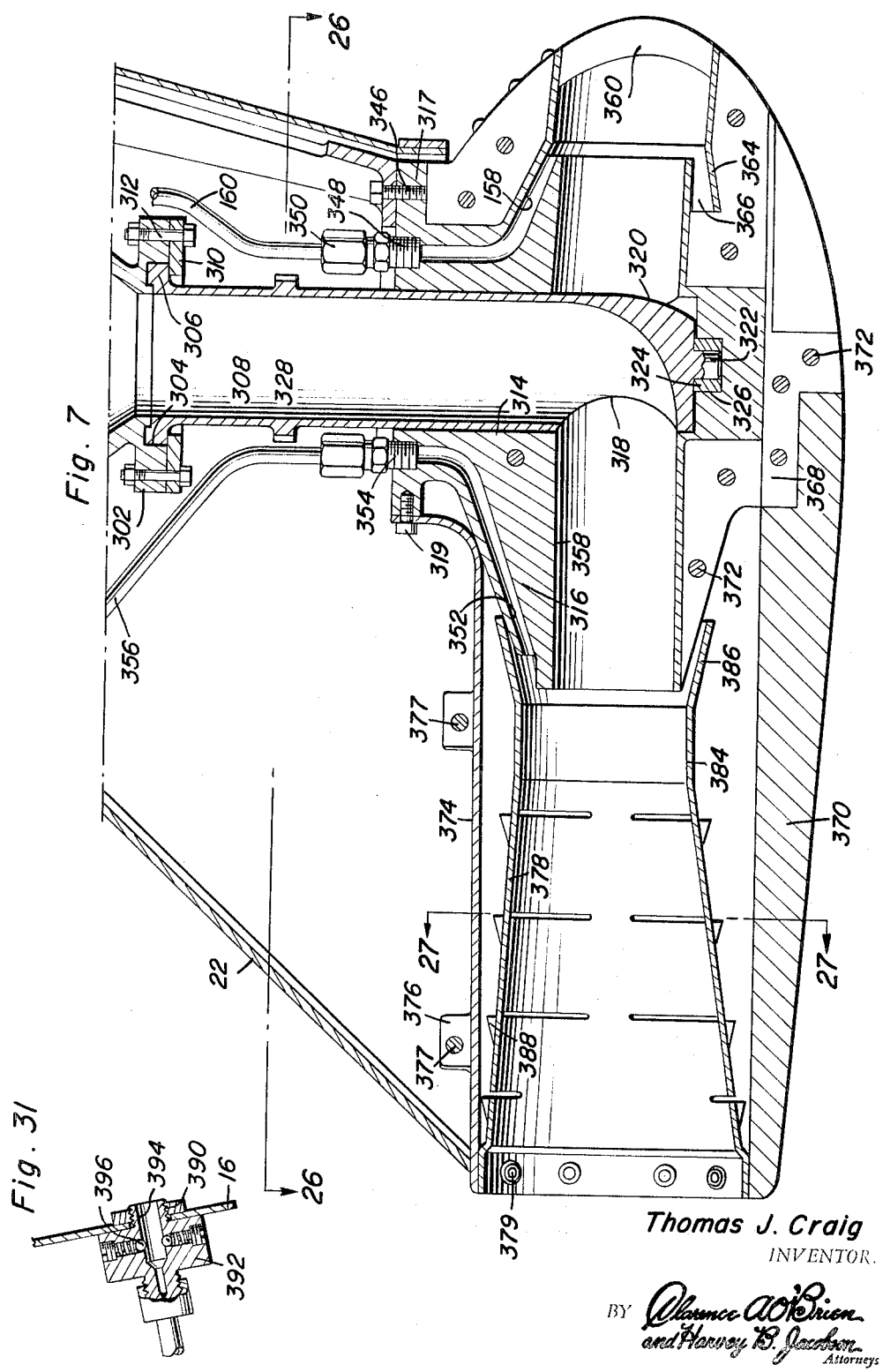

Feb. 21, 1967  T. J. CRAIG  3,304,720
WATER JET PROPELLED OUTBOARD BOAT MOTOR
Filed Dec. 7, 1964
15 Sheets-Sheet 8

Thomas J. Craig
INVENTOR.

BY *Clarence A. O'Brien*
and *Harvey B. Jacobson*
Attorneys

Feb. 21, 1967  T. J. CRAIG  3,304,720
WATER JET PROPELLED OUTBOARD BOAT MOTOR
Filed Dec. 7, 1964  15 Sheets-Sheet 9

Thomas J. Craig
INVENTOR.

BY *Clarence A. O'Brien*
*and Harvey B. Jacobson*
Attorneys

Feb. 21, 1967    T. J. CRAIG    3,304,720
WATER JET PROPELLED OUTBOARD BOAT MOTOR
Filed Dec. 7, 1964    15 Sheets-Sheet 10
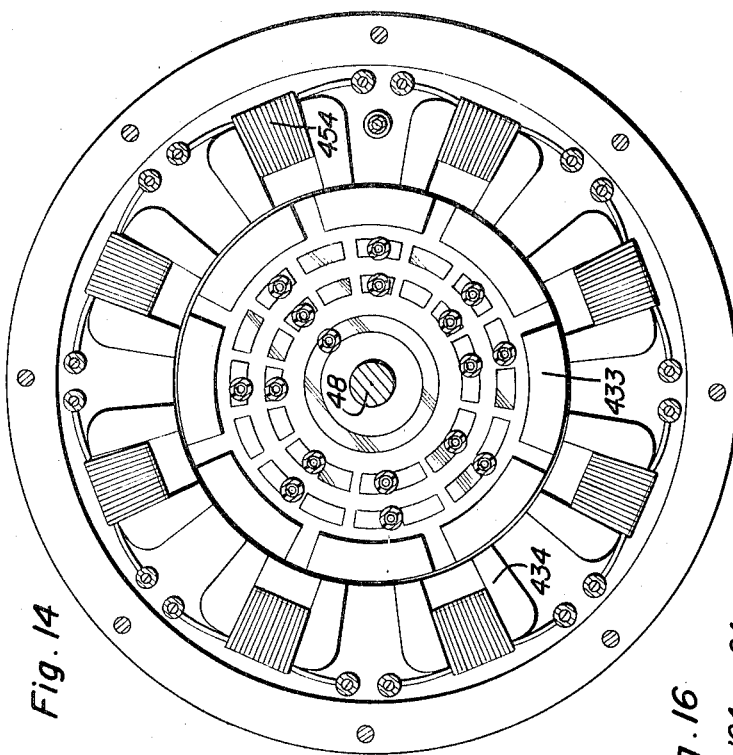
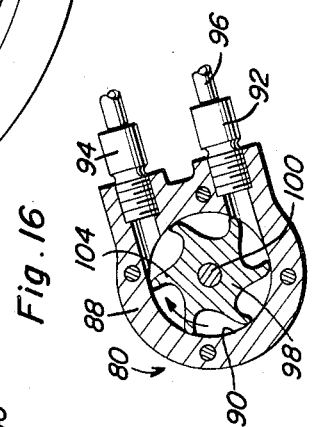
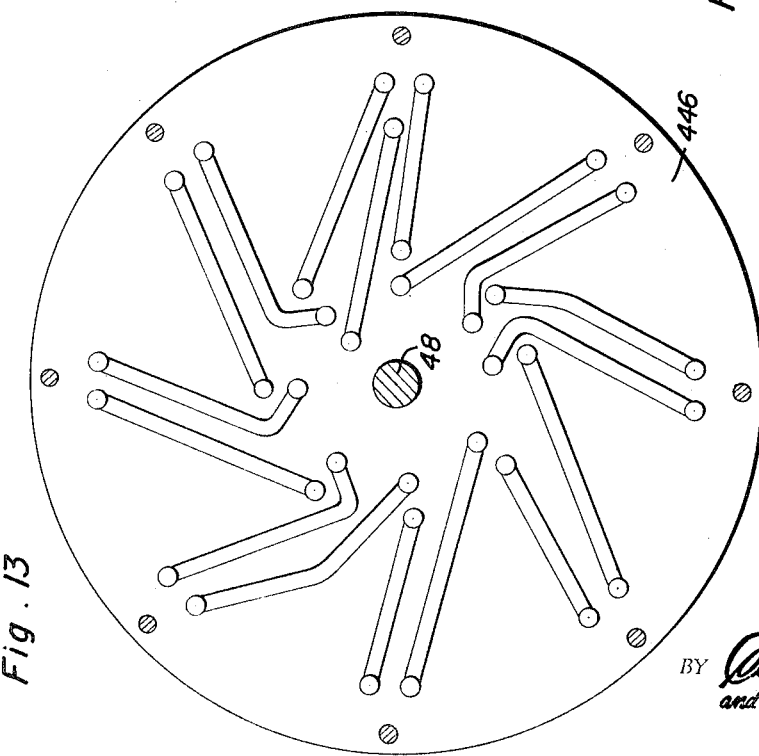
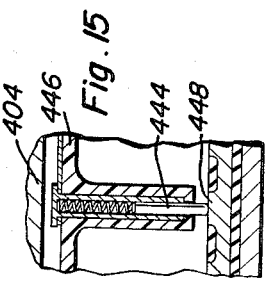
Thomas J. Craig
INVENTOR.
BY Clarence A. O'Brien
and Harvey B. Jacobson
Attorneys

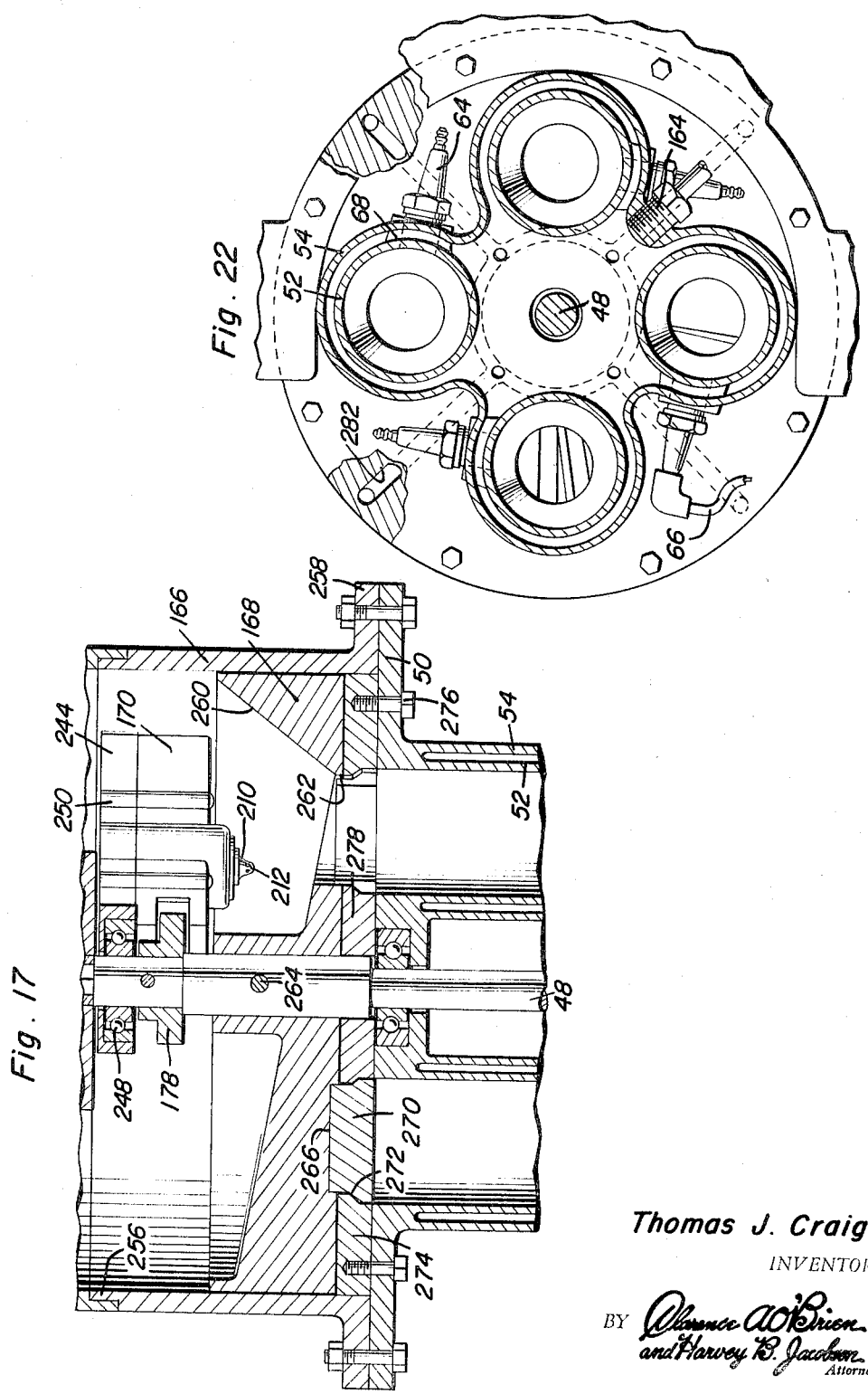

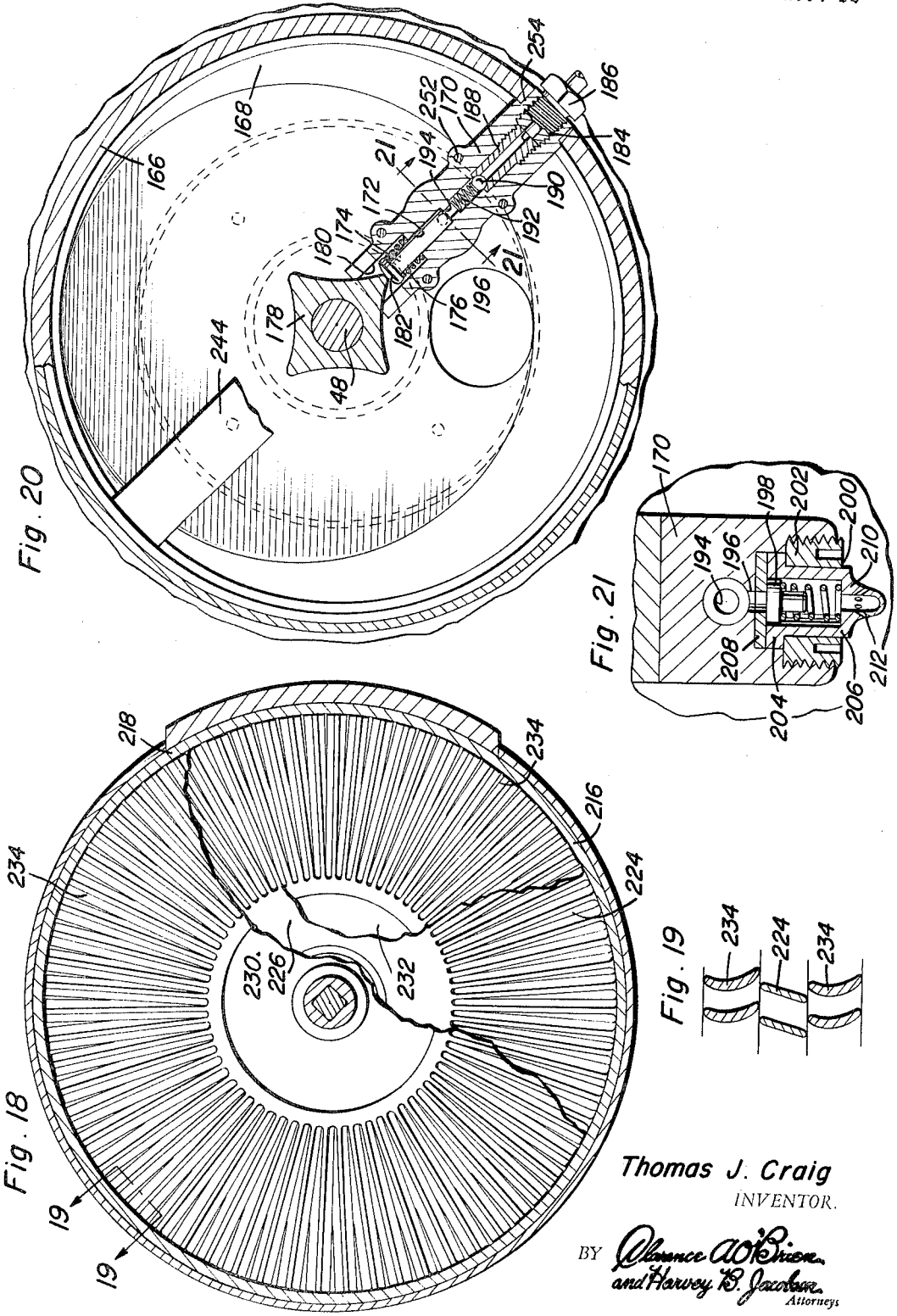

Feb. 21, 1967 T. J. CRAIG 3,304,720
WATER JET PROPELLED OUTBOARD BOAT MOTOR
Filed Dec. 7, 1964 15 Sheets-Sheet 13
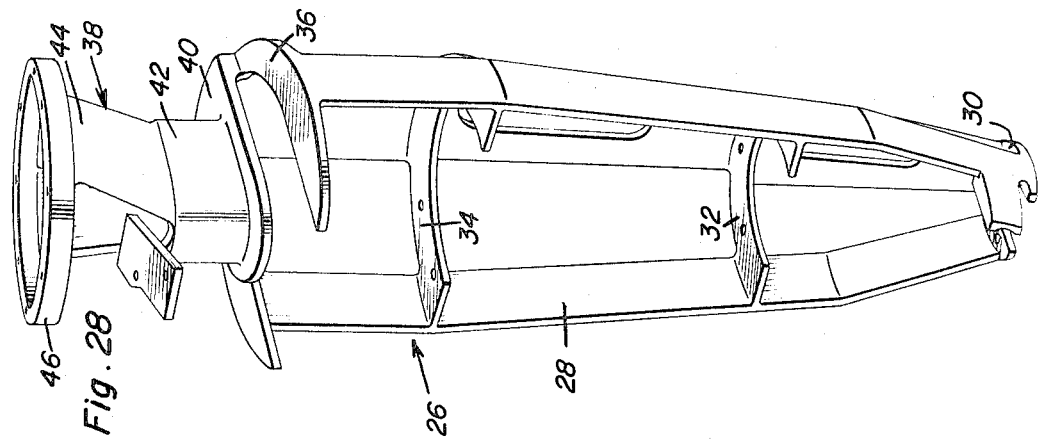
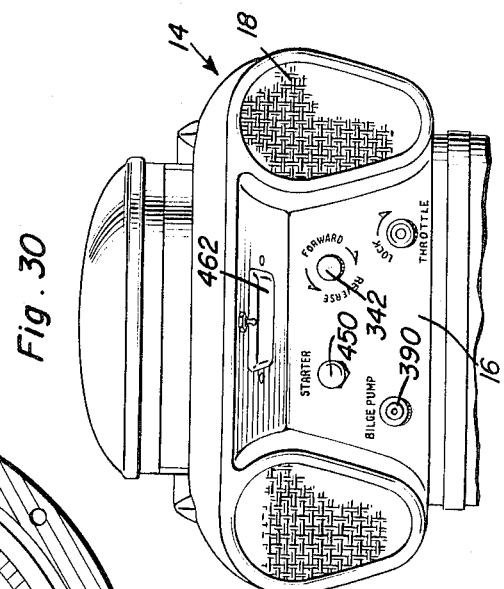
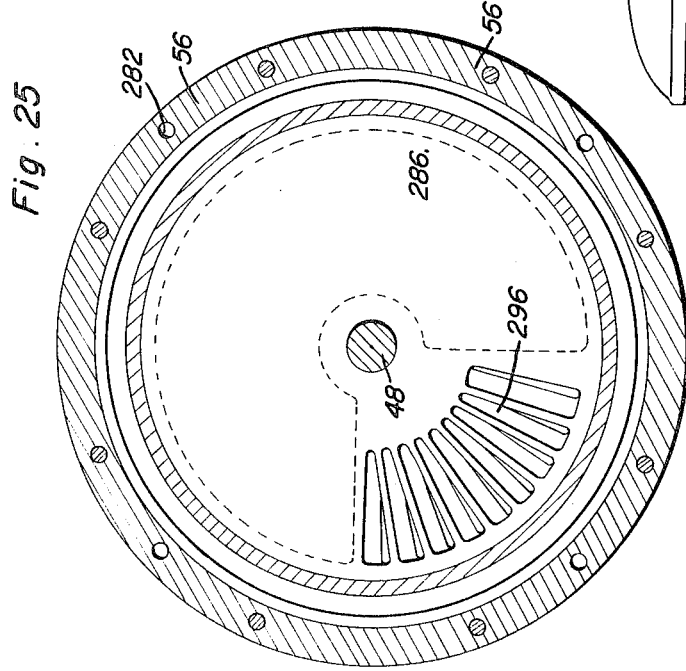
Thomas J. Craig
INVENTOR.
BY Clarence A. O'Brien
and Harvey B. Jacobson
Attorneys Feb. 21, 1967  T. J. CRAIG  3,304,720
WATER JET PROPELLED OUTBOARD BOAT MOTOR
Filed Dec. 7, 1964  15 Sheets-Sheet 14
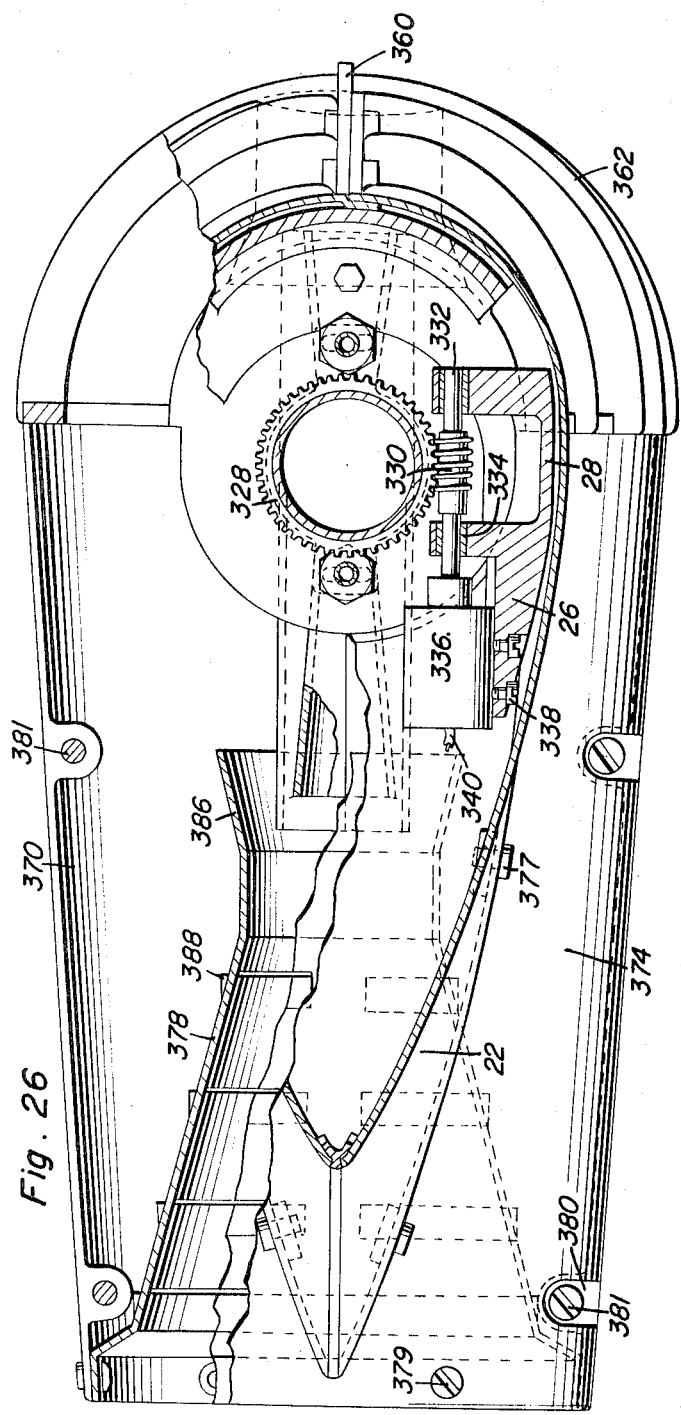
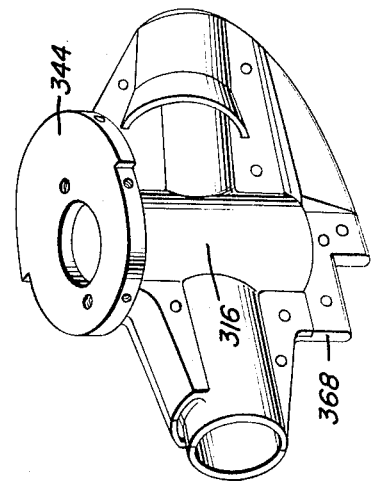
Thomas J. Craig
INVENTOR.
BY Clarence A. O'Brien
and Harvey B. Jacobson
Attorneys Feb. 21, 1967  T. J. CRAIG  3,304,720
WATER JET PROPELLED OUTBOARD BOAT MOTOR
Filed Dec. 7, 1964  15 Sheets-Sheet 15
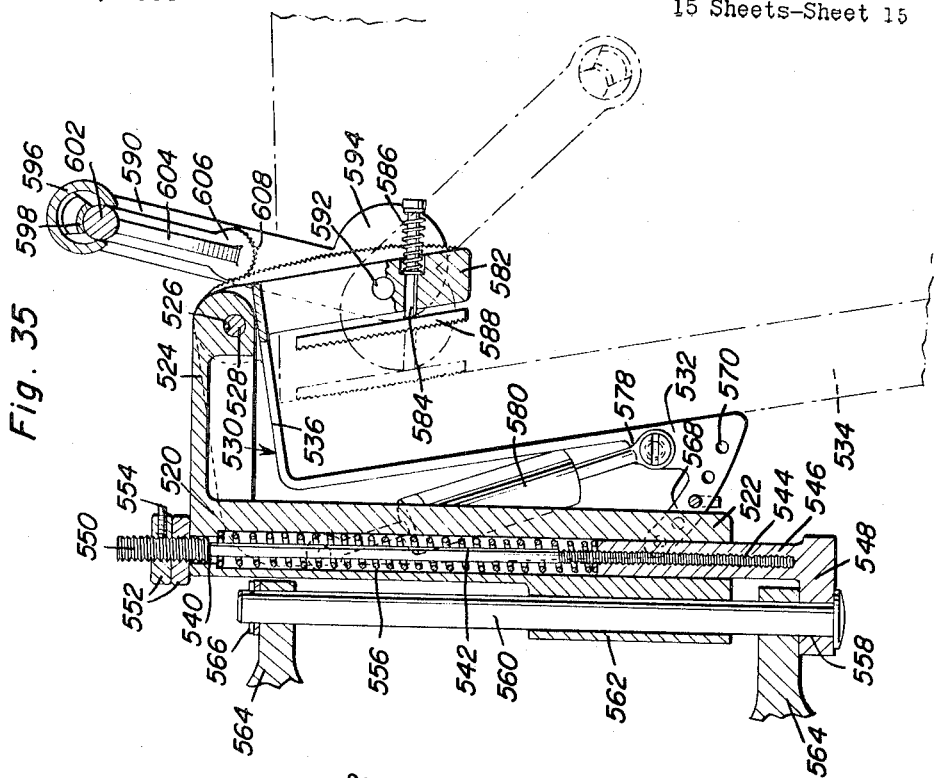
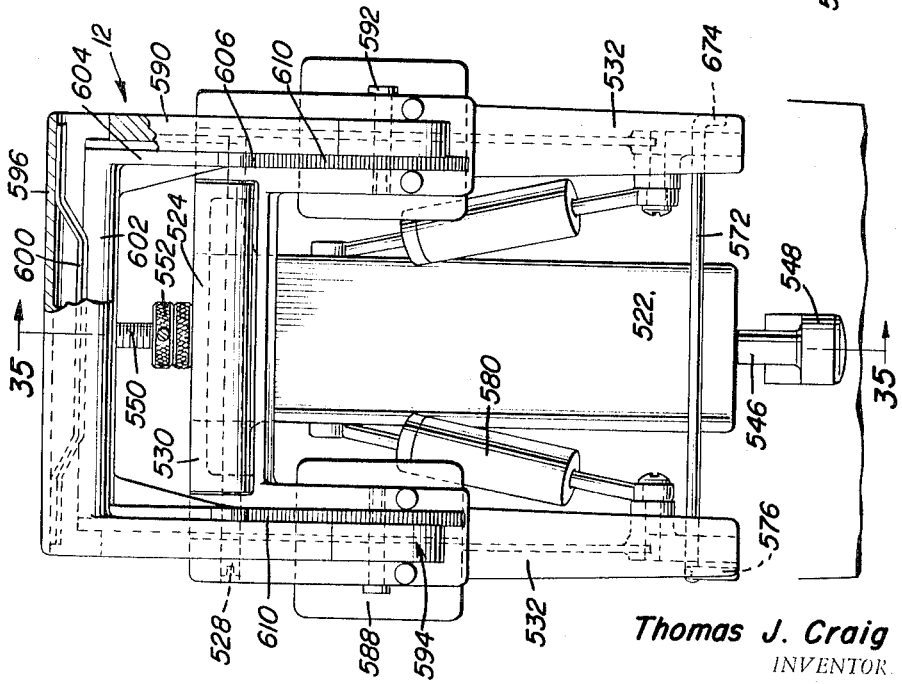
Thomas J. Craig
INVENTOR
BY Clarence A. O'Brien
and Harvey B. Jacobson
Attorneys

United States Patent Office 3,304,720
Patented Feb. 21, 1967

3,304,720
WATER JET PROPELLED OUTBOARD
BOAT MOTOR
Thomas J. Craig, 117 Kensington Drive,
Utica, N.Y. 13501
Filed Dec. 7, 1964, Ser. No. 416,544
8 Claims. (Cl. 60—222)

The present invention generally relates to a propulsion device for water-borne objects such as boats and the like which employs the principle of the exhaust gases of an engine being discharged so that the reaction of such discharge combined with water will propel the water-borne craft or object.

An object of the present invention is to provide a motor particularly adapted for use as an outboard motor for boats although it can be adapted for use as an inboard motor and may be used with other types of water-borne craft or objects and in which the motor incorporates generally the principle of a ram pulse jet controlled cycled motor with the exhaust discharge being partially below water and into the atmosphere for providing a water jet propulsion effect upon the boat.

Another object of the present invention is to provide a boat motor having a novel arrangement of components orientated in such a manner that they are compact yet efficient in operation and including such features as a combined starter and generator assembly, a combined fuel and water pump, a manual starter, a compressor, a distributor combined with the starter-generator, a fuel injection pump and control, a plurality of stationary combustion chambers and mechanism for introducing a combustible charge into said combustion chambers, igniting the charge and discharging the exhaust products.

Another object of the present invention is to provide a boat motor in accordance with the preceding objects having a discharge tube disposed generally angled slightly upward thereof for orientation at the water line with the discharge tube being communicated with the exhaust products so that said exhaust will cause the water confined within the discharge tube to be discharged against the water and air for producing a water jet effect for propelling a boat. The discharge tube is reversible for controlling the direction of jet thrust on the boat.

Yet another object of the present invention is to provide an outboard motor for use with boats having a novel mounting assembly for mounting the motor on the transom of a boat in a secure manner to provide a quick one-motion clamping and locking action thereby eliminating present in-use two swivel wing clamps. The mount also has the novel feature of being adjustable to fit all present size transom plates with a vertical adjustment incorporated therein for vertically adjusting the position of the motor relative to the transom of the boat and allowing the motor to rise upward when entering shallow water or for beaching the boat or object.

Yet another object of the present invention is to provide a motor for boats having a bilge pump operatively associated therewith and provided with a louvered exhaust assembly which enables intake of water to be intermingled with the expanding exhaust gases within a discharge tube for discharge longitudinally from the tube.

Another feature of the present invention is to provide an outboard motor which will generate gaseous pressure effective to propel a boat through water in any direction without the disadvantage of excessive weight or loss of power due to propeller cavitation.

Yet another object of the present invention is to provide a boat motor which produces thrust to motivate the boat by exploding a mixture of fuel and air in a chamber or chambers which has been compressed before firing and then directing the expanding gases down through a set of turbine blades to operate drive shaft with the gaseous pressure continuing further downward for discharge through a reversing tube and out through a passage provided therein against the water impounded within a louvered housing so that the water is then expelled outwardly partially against other water and partially against the atmosphere.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a detailed longitudinal sectional view, on an enlarged scale, of the upper portion of the engine illustrating various structural details thereof;

FIGURE 5 is a sectional view similar to FIGURE 4 but illustrating the portion of the engine immediately below that portion illustrated in FIGURE 4;

FIGURE 6 is a detailed sectional view of a portion of the engine below that portion illustrated in FIGURE 5;

FIGURE 7 is a detailed sectional view of the lowermost portion of the engine, the sectional views in FIGURES 4–7 illustrating a complete vertical sectional view of the motor;

FIGURE 13 is a sectional view taken substantially upon a plane passing along section line 13—13 of FIGURE 4 illustrating the top of the combined starter and generator;

FIGURE 14 is a top plan sectional view taken substantially upon a plane passing along section line 14—14 of FIGURE 4 illustrating the structural details of the combined starter and generator;

FIGURE 15 is a detailed sectional view taken substantially upon a plane passing along section line 15—15 illustrating a contact structure employed in the combined starter and generator;

FIGURE 16 is a detailed sectional view taken substantially upon a plane passing along section line 16—16 of FIGURE 4 illustrating the structural details of the water pump;

FIGURE 17 is a vertical sectional view taken substantially upon a plane passing along section line 17—17 of FIGURE 5 illustrating the orientation of the combustion chambers, main shaft, injection fuel pump and rotating head;

FIGURE 18 is a plan sectional view taken substantially upon a plane passing along section line 18—18 of FIGURE 5 illustrating the construction of the air compressor;

FIGURE 19 is a detailed sectional view taken substantially upon a plane passing along section line 19—19 of FIGURE 18 illustrating the specific construction of the blades in the compressor;

FIGURE 20 is a plan sectional view taken substantially upon a plane passing along section line 20—20 of FIGURE 5 illustrating the fuel injector assembly;

FIGURE 21 is a detailed sectional view taken substantially upon a plane passing along section line 21—21 of FIGURE 20 illustrating the structural details of the fuel injector nozzle;

FIGURE 22 is a plan sectional view taken substantially upon a plane passing along section line 22—22 of FIGURE 5 illustrating the construction of the combustion chambers and the spark plugs associated therewith;

FIGURE 25 is a plan sectional view taken substantially upon a plane passing along section line 25—25 of FIGURE 6 illustrating the construction of the lower rotor wheel;

FIGURE 26 is a plan sectional view taken substantially upon a plane passing along section line 26—26 of FIGURE 7 illustrating the structural details of the reversing tube and the mechanism for operating the same;

FIGURE 28 is a perspective view of the main frame;

FIGURE 29 is a perspective view of the lower venturi housing;

FIGURE 30 is an elevational view of the control panel and air ducts;

FIGURE 31 is a detailed sectional view of the bilge pump connector on the control panel;

FIGURE 32 is a detailed sectional view of the metering control valve and hand throttle remotely connected thereto;

FIGURE 34 is an elevational view of the mounting clamp with portion thereof broken away illustrating the structural details thereof; and FIGURE 35 is a vertical sectional view taken substantially upon a plane passing along section line 35—35 of FIGURE 34 illustrating further structural details of the mounting clamp for the outboard motor.

Figure 1:
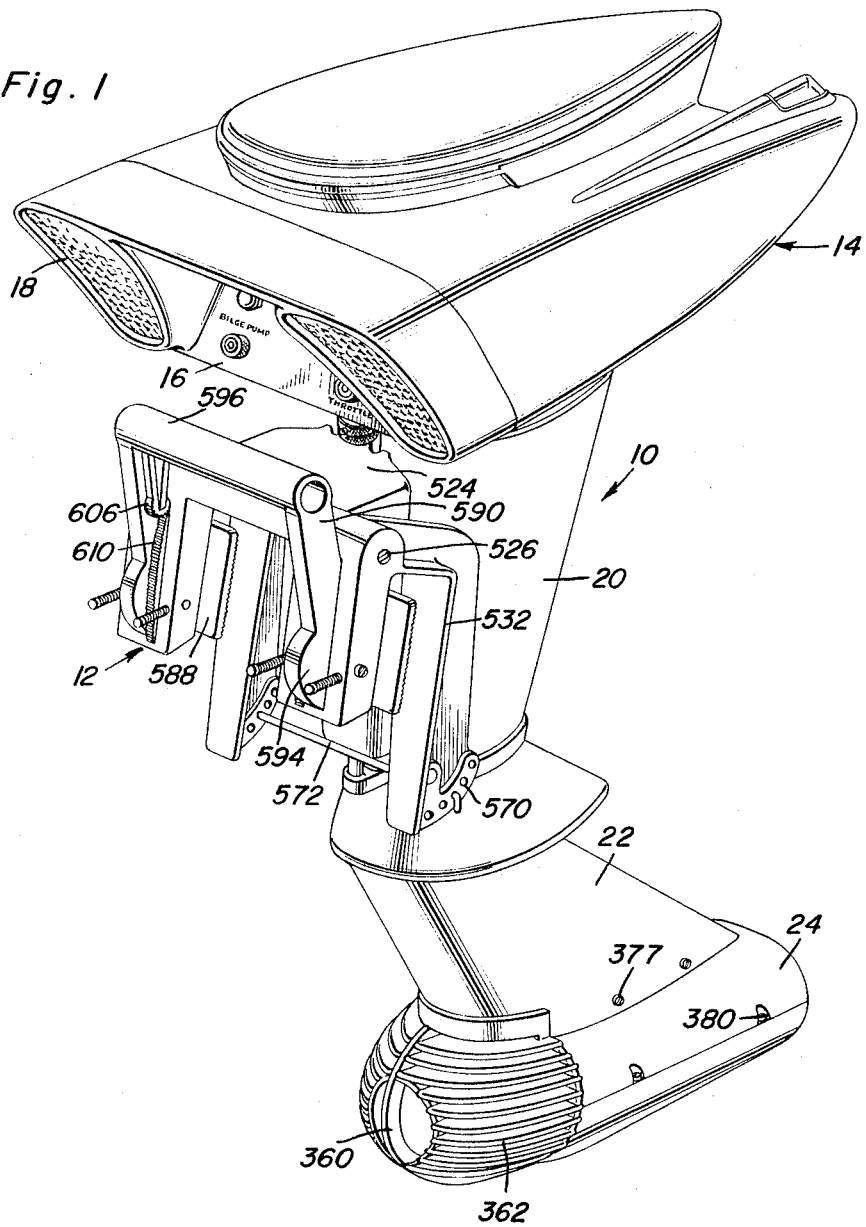
FIGURE 1 is a front perspective view of the outboard motor of the present invention.
Figure 2:
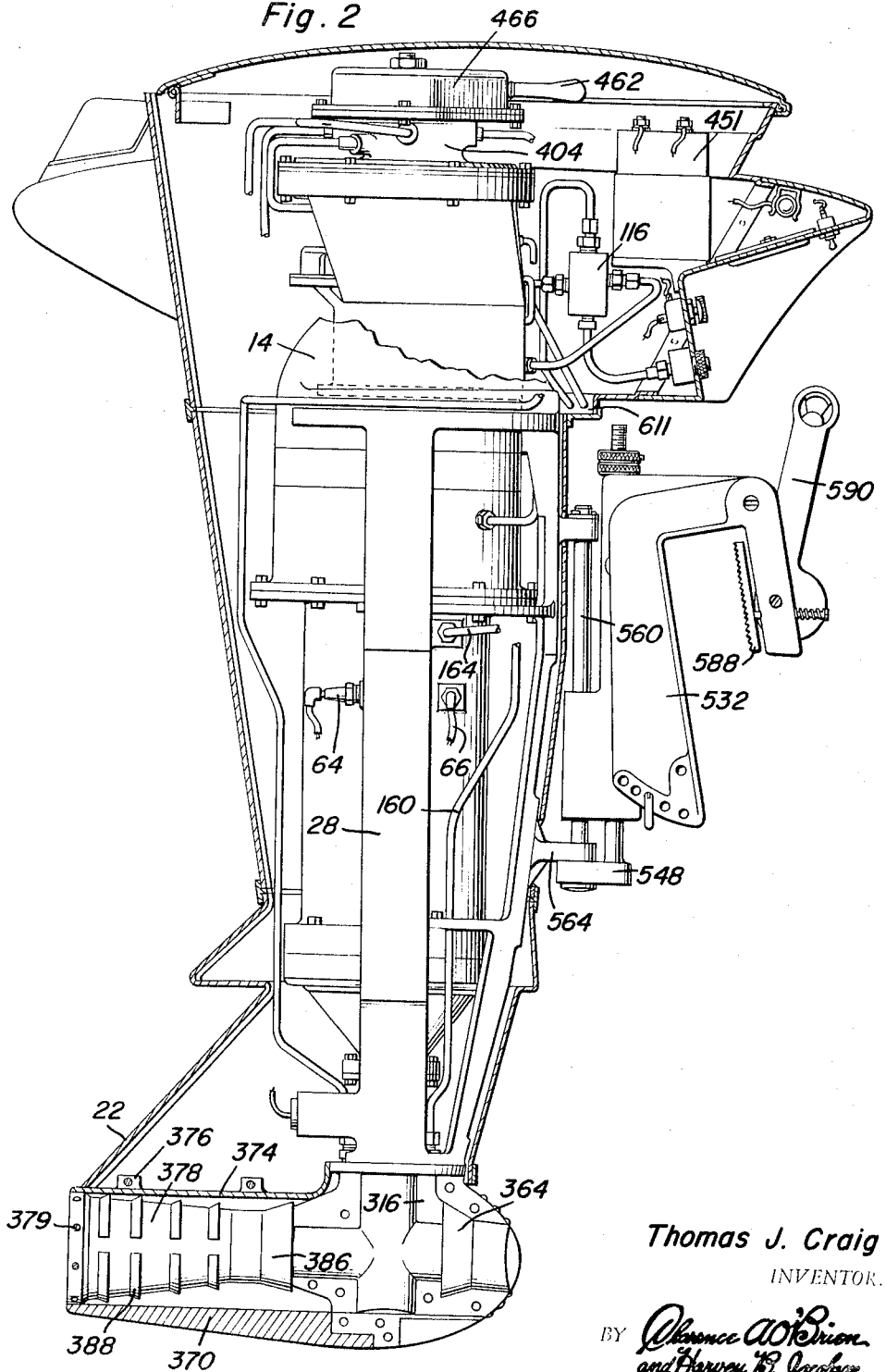
FIGURE 2 is a vertical elevational view of the boat motor with portions of the cover broken away for illustrating the structural details of the motor.
Figure 3:
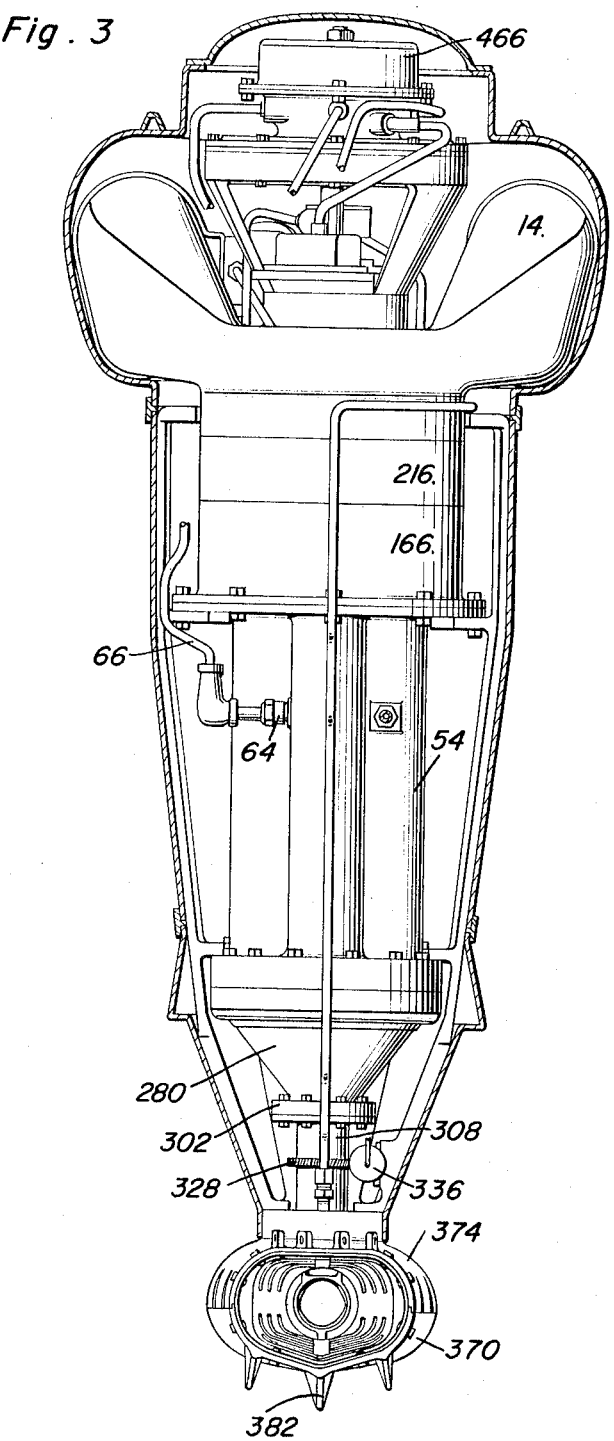
FIGURE 3 is a rear view of the motor with the cover broken away in a manner similar to FIGURE 2.
Figure 33:
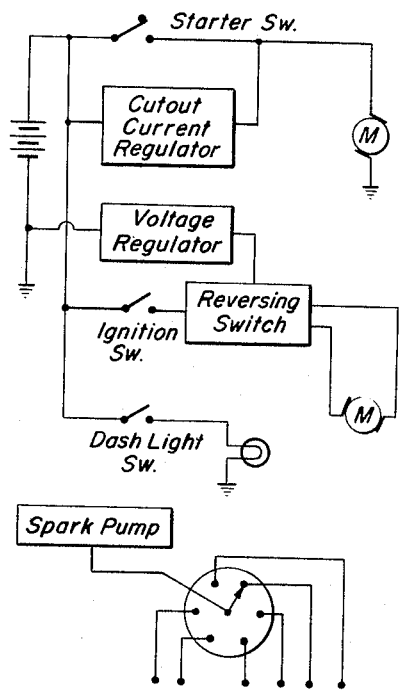
FIGURE 33 is a schematic diagram of the electrical system including the ignition system.

Referring now to the drawings, the principles of the present invention has been illustrated in an outboard motor and having a mounting bracket 12 for attachment to the transom of a boat, an upper housing or cover 14 having a forwardly disposed control panel 16 and air inlet ducts 18 disposed on either side of the control panel 16 for air induction into the motor. An intermediate housing 20 depends from the upper housing 14 and a lower housing 22 is connected with the intermediate housing 20 and a lower venturi housing assembly 24 is connected with the lower housing 22.

The outboard motor is provided with a base frame or main frame generally designated by numeral 26 which, in effect, forms a vertical supporting structure for the components of the motor. The main frame 26 includes a plurality of longitudinally extending members 28 which are rigidly interconnected by a bottom plate 30, a lower intermediate plate 32, an upper intermediate plate 34 and a front plate 36 all of which are generally U-shaped in configuration and have an opening laterally thereof. The longitudinal members converge inwardly towards the bottom of the main frame so that the plates are progressively smaller in plan area from the top to bottom of the frame. Attached to the top plate 36 is an upper supporting structure 38 including a bottom plate 40 attached to the plate 36 at one edge thereof and provided with an upstanding housing or body 42, terminating in an upwardly outwardly flared portion 44 having a flange 46 at the upper end thereof as illustrated in FIGURE 28 of the drawings.

Supported centrally in the motor is an elongated vertical shaft 48 journalled by suitable bearing structures as described in detail hereinafter. Attached rigidly to the upper intermediate plate 34 is a supporting plate 50 integral with a plurality of elongated tubular combustion chambers 52 which are enclosed by a peripheral wall 54. The lower ends of the combustion tubes or chambers 52 and the peripheral wall 54 is engaged under and supported by the lower intermediate plate 32 by virtue of a lower supporting plate 56 thus forming a rigid unit in which a plurality of combustion chambers such as four chambers are orientated around the center shaft 48 with the combustion chambers 52 tapering inwardly slightly at the bottom into discharge nozzles 58. The lower plate 56 has a central recess with a bearing assembly 60 for supporting the shaft 48 and the upper plate 50 also has a recess supporting a bearing assembly 62 for the main shaft 48 for journalling the shaft 48 centrally among the combustion chambers 52.

As illustrated in FIGURE 22 of the drawings, the peripheral wall 54 being spaced from the combustion chamber walls forms a space therebetween which serves as a cooling chamber for receiving cooling water. Also, each of the combustion chambers 52 is provided with an igniter 64 in the form of a spark plug having an ignition wire 66 connected thereto. The spark plug 64 is received in a fitting or adapter 68 which extends into the interior of the combustion chamber 52 and also extends outwardly through the water jacket or peripheral wall 54.

For supplying fuel to the engine, the main drive shaft 48 is provided with a V-belt pulley 70 thereon which drives a V-belt 72 for driving a pulley 74 in alignment therewith carried by a pump shaft 76. The shaft 76 drives a fuel pump 78 and a water pump 80 from the bottom and top ends thereof, respectively. The pumps 78 and 80 are bolted to a generally U-shaped bracket 82 having a depending leg 84 supported on a horizontal supporting plate 40 that is a portion of the main frame 26 for rigidly supporting the fuel and water pumps. The fuel and water pumps are generally the same in structural detail and the details of the water pump 80 is illustrated in FIGURE 16 and includes a housing 88 having a hollow internal chamber 90 provided with an inlet 92 and an outlet 94 connected with suitable tubes, hoses or piping 96. Interiorly of the pump is a rotor 98 carried by the pump shaft 100 that is connected to the main pump shaft 76 by a forked connection 102. The rotor 98 is provided with a plurality of radially extending blades 104 which are curved backwardly slightly in the direction away from rotation so that as the blades 104 rotate, liquid will be taken in through the inlet 92 and discharged through the outlet 94. The pump housing 88 is provided with a removable cover plate 106 secured in place by using screwthreaded fasteners 108 thus enabling repair and replacement of the rotor components. Also, the housing 88 is provided with a base flange 110 attached to the mounting bracket by using suitable bolts 112 or the like. The aperture through which the bolts 112 may be elongated for enabling tension adjustment of the V-belt 72 to maintain proper driving engagement so that the pumps 78 and 80 will be effectively driven. While the details of the water pump have been described in detail, the fuel pump 78 is substantially the same with the inlet thereof being communicated with a fuel line to connector 611 and subsequent line to an external fuel tank provided on the boat in a convenient location. The fuel pump is provided with an outlet pipe or tube 114 for discharging fuel under steady pressure through a meter throttle control valve 116 through an inlet pipe or tube 118 which is actually an extension of the tube or discharge pipe 114.

FIGURE 32 illustrates the details of construction of the throttle control valve which controls the speed of the engine. This includes a body having a passageway 120 communicating with the inlet 118 and a passageway 122 communicating with an outlet tube 124 which discharges to the fuel injector and also a passageway 126 communicating with an outlet 128 which is fuel return or by-pass line which goes back to the fuel tank and the passage 126 is located below the passage 120 and both of these passages communicate with the passage 122. The lower portion of the passage 122 is enlarged as at 130 in order to define a valve shoulder 132 engaged by a tapered needle valve 134. The needle valve 134 is adjusted by a hand throttle 136 mounted on the front control panel 16 with the mounting of the hand throttle being in the form of a threading bushing 138 fixed to the panel 16. The bushing 138 has a bore 140 to receive a collar 142 on the control cable 144, and also receives a flange 146 on the interconnect rod 148 having the handle 136 attached thereto or in the event a remote control is provided, the flange 146 will be on a remote control cable. The bushing assembly is locked to the front panel 16 by the shoulder on the bushing 138 by a retaining nut 150 threaded onto the bushing and the collars or flanges 142 and 146 are retained in position by a cap 152 also threaded onto a smaller extension on the bushing 138. The interconnect cable or rod 148 has a square shank projecting 154 which extends into the control cable 144 thereby actuating said cable when rotated which in turn imparts an in or out movement to the needle valve 134. In operation, if the needle valve 134 is seated against the valve seat 132, fuel entering the inlet port or passage 120 will pass around the necked down shank 156 of the needle valve 134 and then out through the by-pass port or passage 126 back to the fuel tank. As the needle valve 134 is backed off from the valve seat 132 by the rotation of the control cable 144, a proportionate amount of fuel flows around the tip of the valve 134 and out through the fuel injector outlet port or passage 122. The fuel pump 78 maintains a steady pressure forcing the fuel through the metering throttle control valve 116 with the excess fuel by-passing back to the external supply tank.

Coolant water is drawn into the pump 80 from a coolant water inlet port or passage 158 in the lower venturi housing assembly 24 and is conducted to the intake of the pump by a suitable tube 160 and then is forced by the impeller through a connecting line or tube 162 to the firing chamber water intake connection 164 for circulating water through the cooling chambers surrounding the combustion chambers 52.

As set forth previously, the water pump and fuel pump are identical and supported by the bracket and the impeller of each of the pumps may be molded plastic or metal and may have fixed fingers, blades or wipers which are slightly swept back for causing intake of fuel or water from an external source to be discharged to its servicing parts.

The fuel injector assembly is mounted on a cylindrical housing 166 which receives a rotating combustion head 168 and the details of the injector assembly is illustrated in FIGURE 17, 20 and 21. The injector assembly includes a machined steel housing 170 having a bore 172 therein receiving a piston 174 constructed of hardened steel and engaged with a spring 176 which urges the piston toward a four lobe cam 178 which engages the enlarged head of the piston through a clearance slot 180 formed in the end of the housing 170. Thus, the rounded headed end 182 of the piston 174 forms a cam follower for engaging the injector cam 178.

The other end of the housing 170 is provided with an internally threaded bore 184 for engaging a pipe fitting 186 and a tubular bushing or sleeve 188 having the inner end thereof provided with a ball seat for engagement by a ball valve 190 held against the seat by a spring 192. The sleeve or bushing 188 is threaded into engagement with a shoulder at the inner end thereof. A passage 194 communicates with the pipe fitting and the chamber containing the ball check valve and spring and extends through an aperture to meet integrally with openings from the piston chamber or bore 172 and the perpendicular opening or aperture 196 which opens into an injector chamber. On the bottom side of the housing 170, there is provided a threaded bore receiving a valve 198, a spring 200 holding the valve in closed relation to the passage or aperture 196. A screwthreaded bushing or nut 202 is internally threaded into the internally threaded bore and engages a shoulder 204 on the nozzle housing 206 which receives the spring 200 and the valve 198. The valve 198 engages an apertured valve plate 208 for closing the passage through the valve plate 208 which is the same as the passage 196 which extends into communication with the passage 194. The valve 198 also has a stem extending into the spring 200 for retaining the valve in assembled condition. Also, the injector housing includes a nozzle tip 210 having a plurality of nozzle orifices 212 so that fuel passing therethrough will be broken up into relatively small droplets for atomization when mixed with air.

In operation of the fuel system, fuel is received from the fuel pump 78 through the connecting lines and the control valve through the fitting 186 where it will flow around the ball check valve 190 through the communicating passage to the chamber at the inner end of the bore 172 due to a 45° clockwise movement of the cam 178 thereby allowing piston 174 under the influence of the spring 176 to move outward to the low spot on the cam 178. The fuel is then retained in this area by the reseating of the ball check valve 190 by the valve spring 192 against the valve seat formed by the inner end of the bushing 188 and also, the valve 198 is retained in seated position against the valve seat or plate 208 by virtue of the spring 200.

The fuel contained in the chamber at the inner end of the piston is then compressed by inward movement of the piston due to rotation of the cam 178 so that a high point thereof engages the piston 174 as illustrated in FIGURE 20. The piston will continue to travel until the high point on the cam reaches its peak at which instance the pressure of the compressed fuel becomes greater than the expansion strength of the valve spring 200 thus compressing the valve spring 200 and opening the valve 198 allowing the fuel to be ejected downward and out through the nozzle openings which may be six in number and each of the openings may be .006 inch in diameter so that the fuel discharged about the periphery of the nozzle tip 210 will be in the form of a fine atomized mist or spray. Then, as the fuel is ejected out of the chamber disposed inwardly of the piston 174, the pressure therein drops allowing the valve 198 to be closed by the spring 200 and as the rounded end of the piston 174 follows the cam down to a low spot thereon, fuel is again pumped past the ball check valve by the fuel pump into the chamber at the inner end of the piston whereupon a corresponding number of ejection operations is provided depending upon the number of lobes on the cam. In this instance, four lobes are provided and correspondingly four fuel injection operations are repeated for each revolution of the main shaft 48.

The engine is supplied with air through the air ducts 18 whose inner edges are defined by the edges of the front panel 16 as illustrated in FIGURES 1 and 30 and the air ducts are formed of metal or plastic and is in the form of a housing with a metal mesh covered air filter or the like being employed in the intake end of said air ducts. The air duct housing 14 extends rearwardly and encompasses the upper end of the main frame 26 and is secured to the step on the top edge of the air compressor assembly. A metal or plastic cast housing 216 is provided with a machine offset 218 on the top side thereof to receive the bottom end of the air duct 220. The housing 216 is provided with an inside machined offset or step 222 for receiving the combustion head housing 166 as illustrated in FIGURE 5. The compressor includes stator blades 224 integral with the housing 216 at the center of the vertical height thereof with the central hub 226 interconnecting the stator blades 224 and being provided with a recess receiving a bearing assembly 228 for the center shaft 48 which is actually a segmental shaft as described hereinafter.

As part of the compressor, illustrated in FIGURES 18 and 19, there is provided two compressor wheels, namely an upper compressor wheel 230 and a lower compressor wheel 232 each of which includes cast blades 234 whose shape is such that air will be forced downward and accelerated and compressed by passing through the center stator and then through the lower compressor wheel. The two compressor wheels are mounted within the housing 216 by being affixed to the shaft 48 by pins 236 which also extend through a hollow shaft 238 which is received within the bearing assembly 228 and is actually an extension of the main shaft 48 or a part of the main shaft 48 whereby the uper and lower compressor wheels are driven by their connection with the main shaft 48. The shaft 238 has a square hole formed at its center which mates with the upper housing shaft 240 and the lower end it mates with the mid-section main shaft 242 all of which are component parts of the main shaft.

The combustion head housing 166 is a metal casting provided with an integral rib 244 having at its center a machined core 246 for receiving a bearing assembly 248 for the main drive shaft and in particular the intermediate drive shaft 242. One leg of the rib 244 has bosses 250 thereon for receiving fastening bolts or screws 252 for mounting the fuel injector housing 170 thereon. At one side edge of the housing 166, there is provided an opening 254 for receiving the outer end of the housing 170 and at the top edge of the housing 166 is a shoulder or offset 256 which receives the bottom edge of the air compressor assembly housing 216. The bottom of the housing 166 is provided with a peripheral flange 258 that is provided with mounting holes to match with the mounting holes in the flange 50 of the firing chamber assembly. The compressed air is mixed with the injected fuel during each cycle from the fuel injector nozzle 210 in the rotating combustion head 168. The combustion head 168 is provided with inclined or angulated interior side walls 260 with the side walls or surfaces 260 sloping down to an aperture or orifice 262 which is at the bottom or lowermost point of the inner periphery. The combustion head 168 is secured to the main shaft 48 by a transverse pin 264 whereby the combustion head 168 will be caused to rotate with the shaft 48 in a controlled or timed relationship to the fuel injector operating cam 178. The outside diameter of the rotating combustion head 168 is substantially a sliding fit with the inside diameter of the combustion head housing 166. The bottom side of the combustion head 168 has an annular groove 266 provided with mounting holes 268 for receiving a combustion head ring 270 having angulated side walls 272 as illustrated in FIGURE 17. The angular sides of the combustion head ring 270 is in a sliding fit contact with an outer head ring 274 secured to the combustion chamber or head 50 by suitable bolts 276 or the like. The inner angulated surfaces of the combustion head ring 270 are in a sliding fit contact with an inner head ring 278 also secured to the combustion head 50 by suitable fastening bolts or the like. The annular ring 270 is split at one side thereof and has a formed opening to match the orifice 262 in the rotating combustion head 168. The air and fuel mixture is swirled downwardly in the rotating combustion head 168 and passes through the orifice 262 in the rotating combustion head 168 and down through the orifice in the rotating combustion head ring 270 into its respective firing chamber 52. Sealing action for subsequent firing chambers is maintained by the lower surface of the combustion head ring 270 whose sides are integral with the firing chamber's top edge and by the inner and outer head rings 278 and 274.

One complete 360° rotation of the rotating combustion head 168 causes the fuel and air mixture orifice 262 therein to pass over each of the four firing chambers 52 and the firing chamber assembly thereby allowing a fuel and air mixture to be injected into each respective chamber. The fuel and air mixture is fired in cycle in the respective chambers by the spark plug 64 assembled in each chamber.

The firing chamber assembly is stationary and the four chambers 52 are cast in a circle 90° apart with the lower ends thereof tapering as at 58. The outer wall 54 provides space about all four chambers 52 and the flange at the top secures the combustion chamber assembly to the combustion head housing 166 and the outer head ring 247 and the center core of the combustion chamber assembly receives the bearing assembly 60 and 62 for the main shaft 48.

The outer wall 54 is provided with the threaded intake connection 164 which enables the coolant to circulate around the firing chamber. On the lower end of the firing chamber assembly, the flange 56 mates with an engages the lower rotor housing 280.

The flange 56 on the combustion chamber assembly is provided with a plurality of ducts for passages 282 therein which are formed in each flange and open into the inner wall of said housing an running laterally outwardly from a ring 284 about a cord opening which is a clearance for the main drive shaft 48. On the lower end of the main drive shaft, there is a rotor wheel 286 which is pinned to the shaft 48 by a pin 288. The outer periphery of the lower wheel has a peripheral rib 290 on the upper surface thereof and a peripheral rib 292 on the lower surface thereof which is received in guiding grooves 294 on the flange 56 on the combustion chamber and on the lower rotor housing 280. A plurality of blades 296 are formed integrally within the lower rotor wheel 286 in a 90° segment thereof and their profile is so shaped as to provide maximum blade surface exposure to the downward thrust of the expanded gases from the firing chamber 52 above. The remainder of the wheel surface at the upper side is solid and flat to form a shield for the firing chamber next in the firing cycle and subsequent chambers and the bottom side of the wheel 286 is undercut for purposes of lightening the rotor wheel.

The lower rotor housing 280 contains a flange 298 at the upper end thereof and is attached to the lower flange 56 of the firing chamber assembly and the ducts in the flange 56 continue through the flange 298 for drainage of coolant from the combustion chamber assembly. An annular drip pan or ring 300 is mounted on the underside of the flange 298 and is so formed to circulate and drain the coolant about and down around the sides of the housing. The housing 280 is tapered and is hollow interiorly and is generally shaped in the form of a frustum of a cone. The lower end of the housing 280 is provided with a peripheral flange 302 of lesser diameter than the upper flange 298 and the flange 302 has a machined ring and bearing surface 304 to receive a ring 306 on the upper end of the reversing tube 308 and the retainer plate 310 is secured to the flange 302 by bolts 312 which rotatably secure the flange 306 in the groove 304 thus rotatably supporting the reversing tube 308 on the lower end of the housing 280 and communicating the interior of the reversing tube with the interior of the housing 280.

The reversing tube 308 is a formed housing with the flange 306 integral at the top thereof to be retained and provide a bearing surface within the flange 302 of the housing 280. The lower end of the reversing tube 308 fits within a vertical passage 314 in the lower venturi housing 316. The lower end of the reversing tube 308 is provided with an aperture or orifice 318 which is disposed at one side of the reversing tube 308 and the opposite side thereof has a rounded curved or blending surface 320. The bottom end of the reversing tube 308 is solid and provided with a depending boss 322 having a bushing 324 thereon rotatably journalled in a socket or bore 326 in the bottom portion of the lower venturi housing 316 thereby providing a bearing surface for the lower end of the reversing tube and journalling the lower venturi housing 316 thereon.

Attached to the reversing tube above the venturi housing 316, there is a worm gear 328 which may be integral with or rigidly brazed to the tube 308. In meshing engagement with the gear 328 is a worm drive gear 330 carried by a shaft 332 journalled in bushing 334 supported in main frame 26. The worm gear is driven by a torque motor 336 that is also secured to the main frame by fastening screws 338 and which is electrically connected by conductors 340 to a reversing switch 342 on the control panel 16. Thus, the reversing tube 308 is rotated within the venturi housing 316 by virtue of the motor 338 providing rotation to the worm gear 328 attached to the tube 308.

The lower venturi housing casting 316 is a metallic housing having a flange 344 engaging the bottom flange 30 of the main frame being secured thereto by bolts 346.

The venturi housing 316 includes a fitted opening 348 receiving the water intake tube fitting 350 and on the opposite side of the reversing tube 308, there is provided a bilge discharge passageway 352 having a threaded fitting 354 associated therewith in which a bilge pump tube or pipe 356 is connected.

Perpendicular to the passageway 314 which receives the reversing tube 308, the housing 316 is provided with a longitudinal extending passage 358 which is open at both the front and rear ends. At the front end of the passage 358, there is a supporting rib 360 sweeping down and across the front intake opening which provides a mounting surface for an intake grill 362 and acts as a means of fending off any debris that might be drawn into the open end of the passage 358.

Disposed in concentric relation to the intake end of the opening 358 is a flared ring 364 which provides an intake base 366 for intake of water into the opening when the motor is in reverse thereby allowing a definite supply of water in the reverse position of the reverse tube when the gases are discharged from the forward end of the passageway 358. Also, an angular lip or flange 368 depends from the casting or housing 316 and forms a support for the lower stabilizer housing 370 secured thereto by fasteners 372 or the like. The water intake passage 158 is integral with the housing and tangent to the leading edge of the reversing tube outlet at the forward end of the passage 358 and the bilge drain passage 352 is integral with the housing and tangent to the edge of the passage 358 so that as water flows past the opening or rear edge of the passage 358, a vacuum is created in the bilge passage or duct 352 thereby siphoning water out of the boat.

The upper stabilizer housing 374 is attached to a peripheral lip or flange 317 on the housing 316 by bolts 319 with four lugs 376 and bolts 377 attaching housing 374 to the lower housing 22. Venturi tube 378 is secured to the upper and lower stabilizer housings 374 and 370 by fasteners 379 or the like. Inwardly extending bosses 380 are provided along each side of the upper and lower stabilizer housings for receiving fastening bolts 381 and an interlocking edge is provided between the upper and lower stabilizer housings for securing the upper and lower stabilizer housings in assembled relation. The lower outside surface of the stabilizer housing has three angular shaped fins 382, one at the center and one of each side integral with the housing thereby providing stabilization for the motor and may act as a rudder and protect the motor from heavy blows from debris or when striking bottom.

Disposed within the stabilizer housing is the venturi tube 378 which is elliptical shaped at the rear and narrows down at the front as at 384 to form a venturi throat and then the forward end flares outwardly as at 386 to encompass the end of housing 316 as illustrated in FIGURE 7. The peripheral surface of the venturi tube 378 is provided with louvers 388 which project outwardly from the sides and open forwardly to provide a passage into the chamber formed by the sides of the housing. The purpose of the louvers and the flared end to the tube is to allow maximum water to flow into the chamber area of the gas discharge outlet from the reversing tube 308 and the passageway 358. The flared end 386 is so located that a venturi action causes the water to accelerate past the outlet opening of the passage 358 thereby dropping the outlet pressure of the discharge tube causing better gas flow from the tube.

As illustrated in FIGURE 30, the control panel 16 also has a fitting for the bilge pump tube 366 as designated by numeral 390 with the coupling 390 adapted to receive a commercial type plug-in bilge suction drainage so that water may be siphoned from the boat through the tube by means of the water passing across the orifice or discharge end of the passageway 352 for providing a suction in the tube 356. The details of the coupling 390 is illustrated in FIGURE 31 and includes a bushing 392 secured to the panel 16 and provided with a bore 394 for receiving a plug-in tube or hose that is secured in place by a pair of spring loaded ball detents 396 which are disposed radially to the passage 394 for frictionally and detachably retaining a siphon hose for extracting water from the bilges by plugging the hose or tube into the bore 394.

Figure 11:
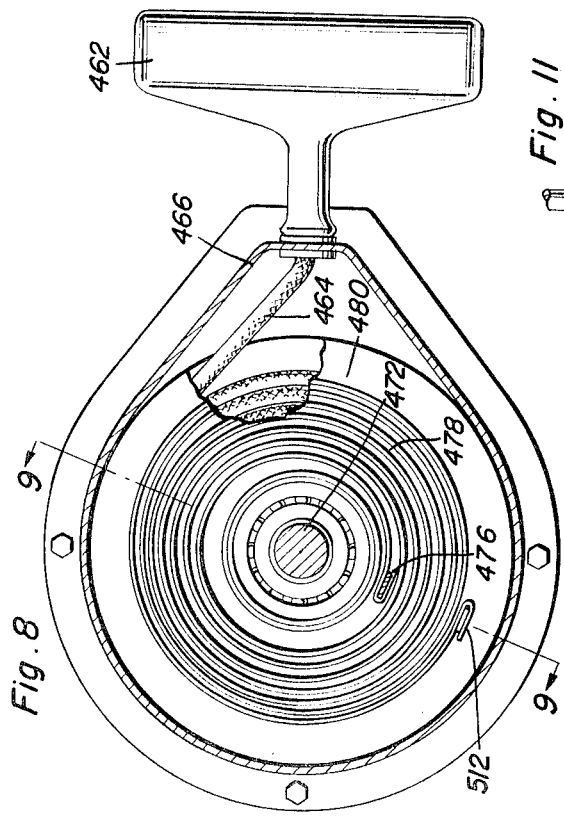
FIGURE 11 is a detailed sectional view taken substantially upon a plane passing along section line 11—11 of FIGURE 4 illustrating the details of the distributor mechanism.
Figure 8:
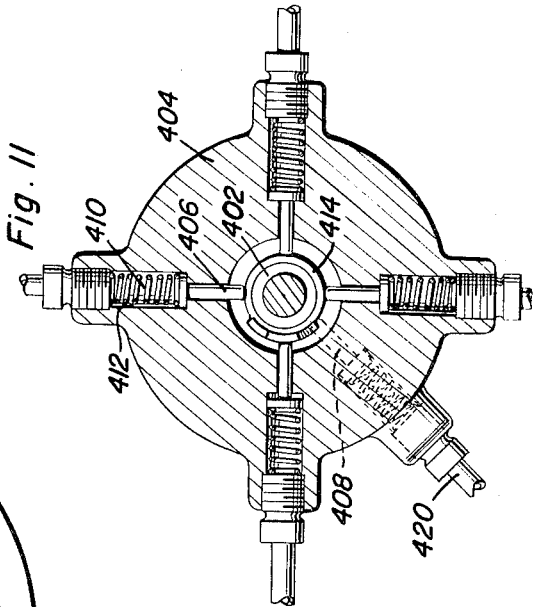
FIGURE 8 is a detailed plan sectional view taken substantially upon a plane passing along section line 8—8 of FIGURE 4 illustrating the details of construction of the manual starter.
Figure 9:
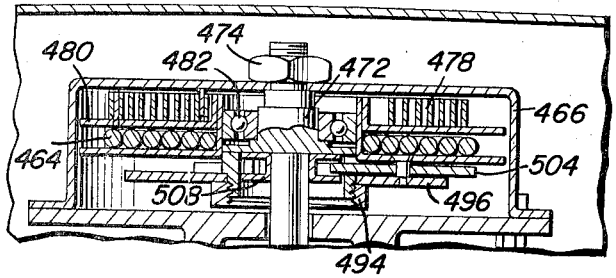
FIGURE 9 is a transverse, sectional view taken substantially upon a plane passing along section line 9—9 of FIGURE 8 illustrating further structural details of the starter mechanism.
Figure 23:
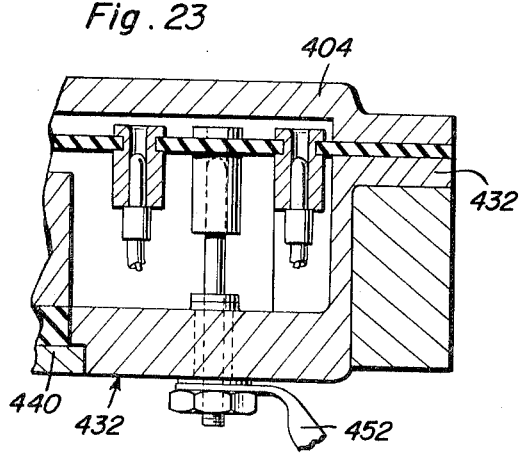
FIGURE 23 is a detailed sectional view illustrating additional details of the distributor-starter-generator assembly.
Figure 24:
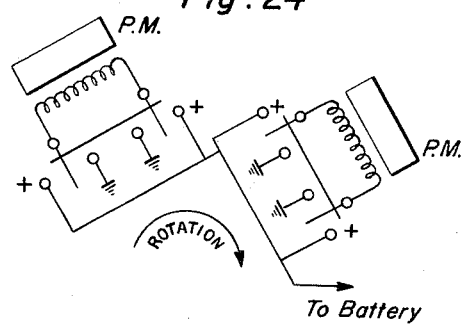
FIGURE 24 is a schematic view of the starter-generator.
Figure 27:
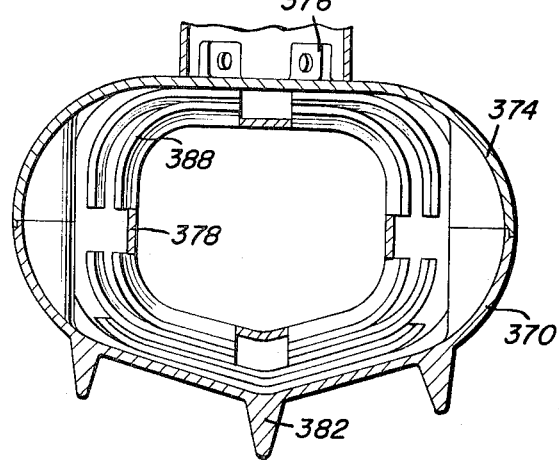
FIGURE 27 is a transverse, sectional view taken substantially upon a plane passing along section line 27—27 on FIGURE 7 illustrating further structural details of the reversing tube.

A distributor assembly 400 is connected with the main drive shaft 48 and includes a rotor 402 secured to the main drive shaft by a suitable pin. Voltage is directed to the spark plugs by the rotor 402 making contact with five points disposed in housing 404. FIGURE 11 illustrates the housing 404 and the rotor 402 and the four contact points 406 orientated in 90° in relation to each other and also the fifth contact point 408 orientated between one pair of points 406. Each of the points 406 as well as the point 408 is retained against the rotor by a compression spring 410 orientated in a radial bore or passage 412 in the housing 404 so that the contact points 406 and 408 will be held in engagement with the rotor 402 which of course has a metallic ring 414 and also an upwardly extending metallic ring 416 in the form of metallic cams press-fitted on the insulated bushing which forms the main part of the rotor that is secured to the main drive shaft by the pin 418. The upper half of the rotor which includes the raised surface 416 will make contact with each of the four points or terminals 406 during each revolution thereby completing the circuit from the contact point 408 to each of the contacts 406 for each revolution of the rotor. Voltage is supplied to the distributor through the contact point 408 which is connected by a conductor 420 to a spark pump 422 mounted on a supporting pad 424 immediately above the pulley 70. The spark pump is actuated in timed relation to the rotor 402 by a four lobe cam 426 attached to the main drive shaft 48 and rotatable therewith. The cam 426 engages a spring loaded plunger 428 which actuates the spark pump 422 thereby providing instantaneous voltage to the distributor through the distributor wire 420, into the contact point 408, into the metallic ring 414 and an upstanding cam lug 416 all of which are conductors thereby providing an ignition voltage to each of the spark plug for each revolution of the shaft 48. The spark pump 422 is a commercially available item and will generate over 20,000 volts and operates on the solid state physics effect called piezoelectricity, which when stressed mechanically produces an electrical voltage.

A starter generator assembly 430 is provided and consists of a housing 432 containing eight permanent magnets 433 mounted on a circular plate 436 fixed to the main shaft 48 by a lock pin 438. The plate 436 is actually a multi-layer assembly including a metallic base plate 440 which is ground and a second metallic plate 442 which is a B-plus conductor and a plastic insulating material such as Bakelite encapsulating the plates 442 and 440. The completed assembly when observed from the top includes three rings about its center with the two outer rings being divided into sixteen segments and the inner ring being continuous. Around the outer periphery are eight electromagnets 434 secured to the assembly. The plate 440 which is ground has two rings of eight pads each of which protrude up through openings provided in plate 442. The second plate 442 has similar matching rings with clearance holes for the pad of the lower plate and also eight pads per ring staggered evenly about the ring. The third inner ring is a continuous raised surface so made that it is the same height as the other two rings. When encapsulated, all of the rings are at the same height.

Sixteen contact pins 444 are mounted on a plate 446 carried by the lower end of the distributor housing 404 and are made to provide terminals which wipe over each segment or section of the segmented rings 448 as illustrated in FIGURE 15. A similar contact pin assembly wipes the inner ring providing a continuous circuit to the B-plus plate since the contact pins 444 are electrically interconnected.

To energize the starter, the starter button 450 on the front panel 16 is depressed thereby closing the circuit between battery 451, a relay and contact through a conductor 452. Current flow is from the battery to the battery plus plate 442 to one or more contacts 444 which energizes its connecting electromagnetic coil 454. The created polarization of the magnetic field exerts a magnetic pull on the permanent magnets 433 thus causing the plate assembly 436 to rotate. The starter switch overrides the relay switch until such time as the engine comes to speed at which time the relay takes over slipping the circuit so that the starter now acts as a generator for switching the current back to the battery. The battery is mounted in a suitable area by a suitable bracket and also supplies electrical energy to the torque motor 336 for reversing the engine and also a front panel light 462 if desired. Also, the usual regulate components for controlling operation of the starter generator may be provided.

While the starting action may be accomplished by using the starter generator assembly, it is pointed out that a manual starting may be provided for the engine in the event the battery is incapable of operating the starter generator unit or in the event that an electrically operated starter generator assembly is not used.

There is provided a manual starting mechanism for the motor that is generally designated by the numeral 460 and which includes a pull handle 462 having a flexible rope 464 attached thereto. The starter assembly is enclosed in a sheet metal housing 466 having outturned flanges secured by bolt 468 to the top flange or plate 470 of the distributor housing 404. The manual starter assembly 460 also includes a lug and housing stud 472 engaged with the main drive shaft 48 and a retaining nut 474 is provided which locks the housing 466 against a shoulder formed on the stud or stud shaft 472. The cover or housing 466 includes an inwardly struck tab 476 which is either struck from or welded or otherwise secured to the housing 466 for engagement in the inner hooked end of the spiral spring 478 which is disposed below the cover or housing 466 and rests on the top flange of a starter rope reel 480.

The stub shaft 472 has a bearing 482 thereon which journals the hub 484 of the starter rope reel 480. The lower end of the stub shaft 472 is provided with spaced plates 486 and 488 which are spaced by bridging members 490 with the lower end thereof being externally screwthreaded at 492 for receiving a retaining nut 494 in the form of a threaded sleeve member. The stub shaft 472 is secured to the main shaft by a suitable pin or keyed connection for rotation therewith.

Figure 10:
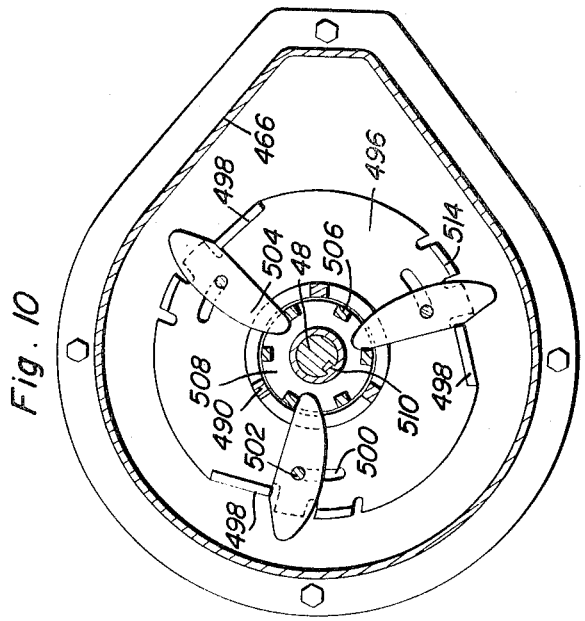
FIGURE 10 is a detailed sectional view taken substantially upon a plane passing along section line 10—10 of FIGURE 4 illustrating further details of the manual starter mechanism and particularly the lugs incorporated therein.
Figure 12:
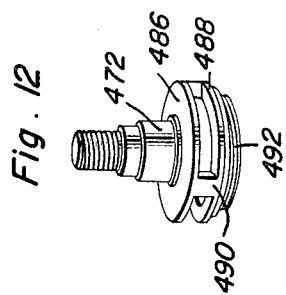
FIGURE 12 is a perspective view of the lug housing forming a part of the manual starting mechanism.

Interposed between the sleeve nut 494 and a downwardly facing shoulder on the stub shaft 472 is a lower plate 496 generally circular in configuration as illustrated in FIGURE 10 but including three-upturned projections 498 and three arcuate slots 500 for receiving pivot pins 502 for mounting lugs 504 thereon. The pins or rivets 502 are rigidly fixed to the lower plate of the starter cord reel 480 and orientate the lugs 504 for pivotal movement for engagement with or disengagement from a plurality of or lugs 506 formed in a lug cage 508 that is keyed or pinned to the main drive shaft 48 by a key 510. The top surface of the plate 496 and the top surface of the lower plate forming the lug cage 508 are substantially flush and the inner ends of the lugs 504 will project between the space between the bridging elements 490 on the stub shaft 472.

When the starter is not engaged, the lugs 504 will be withdrawn from the space between the bridging elements 490 and between the lugs 506. When starting the lugs 504 are pivoted outward by the rotation of the cord reel causing pivot pin 502 to move lug 504 forward against a projection 498 on the lug and cam plate 496 thereby engaging the lugs 504 with the lug cage bridging members or lugs 506 thus turning the main drive shaft. Release of the starter pull handle will enable the spring 478 which has the outer end thereof attached to a tab 512 to return the lugs 504 to their retracted position until needed for future starting action. Also, projections 514 are formed on the plate 496 to limit the pivotal movement of the ratchet lugs 504 in an opposite direction to orientate the lugs 504 so that they will be retained in an angular position generally adjacent the bridging element 490 when in retracted position.

The boat mount 12 is illustrated in FIGURES 34 and 35 and includes a generally L-shaped pivot mount 520 having a vertical leg 522 and a horizontally extending lug 524. The leg 524 is shorter than the leg 522 and includes a transverse passage at the free end thereof designated at 526 for receiving a pivot pin 528 for pivotally supporting a transom frame 530 which includes depending members 532 engaging the end surface of the transom 534 and upper members 536 engaging the upper edge of the transom 534.

In the vertical leg 522, there is an elongated bore or passage 540 receiving an elongated stud 542 which has an elongated lower portion threaded as at 544 for engaging the internally threaded bore in a projecting sleeve 546 that has a supporting lug 548 at the lower end thereof. The upper end of the adjusting stud 542 is threaded as at 550 for receiving a pair of threaded locking rings 552, the upper of which receives a locking member 554 which may be in the form of a setscrew or in the form of a spring loaded pin which will drop into one of a plurality of longitudinally spaced sockets in the threaded upper end of the stud.

A spring 556 encircles the stem 542 with the lower end thereof engaging the upper end of the threaded sleeve or stud 546 and the upper end engaging a shoulder at the upper end of the bore or passage in the vertical leg 522 as illustrated in FIGURE 35.

The lug 548 has an aperture 558 therein which receives an elongated pivot pin 560 which is a headed over pin that goes through the flange 548 of the adjusting sleeve or stud 546 and up through a tubular boss 562 on the leg 522 of the supporting frame 520. The pin 560 also goes through a pair of pivot bosses 564 on the main frame of the motor and a suitable cotter pin 566 and a washer is provided at the upper end thereof for retaining a pivot pin in place for swivelling the motor in relation to the mount about the axis of the pin. Vertical adjustment of the bosses 564 is accomplished by varying the position of the locking rings 552 on the adjusting stud with the main adjustment being by the screwthreaded connection on the lower end of the stud with the adjusting sleeve 546.

The lower ends of the members 532 of the transom frame is provided with outward projections 568 having a plurality of spaced apertures 570 therein for receiving an angular adjustment locking pin 572 having a depending end 574 on one end and a pivoted locking member 576 on the other end. Also, bosses 578 are provided thereon for attachment to one end of a shock absorber assembly 580 which has its other end secured to the upper end of the vertical leg 522 to cushion the shock of pivotal movement of the frame 520 about pivot pin 526.

The forward end of each leg 524 has a depending leg 582 thereon which slidably receives a clamping rod 584 headed at one end and having a spring 586 urging the rod in retracted position. The inner end of the rod has a clamp pad or jaw 588 thereon that is serrated for engaging the transom 534. Pivotally attached to the members 582 is a generally U-shaped handle member 590 having the legs thereof pivoted to the members 582 by a pivot pin 592. The lower ends of the legs of the handle have cams 594 formed thereon for engagement with the outer surface of the locking pads 588. The bight of the handle 590 is a tubular member as at 596 provided with a leaf spring 598 having a central portion 600 spaced from the inner surface of the tubular member 596 and engaging the cylindrical bight portion 602 of a U-shaped locking element 604 which has a circular lower end 606 with gear teeth 608 formed thereon for selective meshing engagement with gear teeth 610 formed on the edge of the supporting members 582.

By squeezing the bight portion 596, the spring 600 will resiliently enable the locking element 604 to be retracted thus disengaging the teeth 608 from the teeth 610 and this enables pivotal movement of the locking handle 590 about the pivot pin 592 thus clamping or retracting the clamp jaws 588. When the locking element 604 is released, the spring 600 will urge it into engagement with the teeth thus locking the handle assembly in adjusted position.

The motor may be raised or lowered to various heights and the spring 556 not only retains this adjustment but acts as a shock absorber as well as allowing the motor to rise vertically when it is in shallow water. The transom locking device may be provided with some suitable mechanism for incorporating a key operated lock therein to prevent the release of the gripping device when desired.

The various components of the engine are covered with a housing of formed aluminum or plastic with the housing for the starter structure being in the form of a pivotal lid, top or the like and the operation of the motor will appear clear from a consideration of the foregoing detailed description. The details of the dash light for the instrument panel and the various latch mechanisms and fasteners for retaining the covering and enclosing panels in place is not described in detail hereinafter and does not form any specific part of the present invention.

Basically, the propulsion forces are produced by the products of the combustion being expelled downward through a reversing tube and into the louvered section of the lower housing against water impounded therein.

It is the thrust of the expanding gases acting as a piston against the impounded water which forces the water in the form of a water jet out against the water and atmosphere.

The motor is so mounted on the transom of the boat to cause the exhaust opening of the lower housing to be angled slightly upward so that the water jet being expelled exerts maximum thrust primarily against the atmosphere and secondarily against the surface of the water (in the rooster tail of the wake).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. In an outboard motor, a plurality of combustion chambers in the form of elongated tubes oriented about a substantially vertical shaft, a rotary compressor connected to an upper portion of said shaft, a rotary combustion head connected to said shaft and located below said compressor, said combustion head having a recess in the top thereof with inclined wall surfaces and an orifice in the low point of said wall surfaces for selective registry with said combustion chambers, a rotary exhaust rotor connected to said shaft below said combustion chambers and having an aperture therein for selectively opening the combustion chambers, said exhaust rotor aperture having a plurality of blades therein for driving said shaft, seal means disposed between the combustion head and said combustion chambers, means for injecting fuel into said combustion chambers and means for igniting said fuel.

2. In an outboard motor as defined in claim 1, a water jacket encircling collectively the combustion chambers, a water pump communicated with said water jacket and driven from said shaft for supplying water to said water jacket, said water jacket having passageways remote from the water pump for discharge of water therefrom thereby providing circulation of water through the water jacket.

3. In an outboard motor as defined in claim 1, said means for igniting said fuel includes a spark plug in each combustion chamber, distributor means including a contact element electrically connected to each spark plug, and means supplying electrical energy to the contact elements in timed relation to rotation of the combustion head.

4. In an outboard motor as defined in claim 1, a starter generator assembly connected to said shaft for rotating the shaft for starting the motor, said starter generator assembly adapted to be electrically connected to a battery for rotating the shaft for starting and recharging the battery when the motor is operating.

5. In an outboard motor as defined in claim 1, a propulsion tube having one end opening in the direction of movement of the motor and the other end opening in trailing relation thereto, and means conveying combustion products discharged through the aperture in the exhaust rotor into said tube and discharging the same in a selected longitudinal direction for producing a driving thrust.

6. In an outboard motor as define in claim 5 for use in propelling a water borne craft with the tube disposed below the water level for mixing combustion products with water as they are discharged, said conveying means including a reversing tube extending laterally into said propulsion tube, one end of said reversing tube receiving combustion products from the combustion chambers, the other end of said reversing tube having a lateral opening for discharging combustion products into the propulsion tube in a longitudinal direction, and means rotating the lower end of the reversing tube in relation to the propulsion tube to discharge the combustion products in a selected direction in said propulsion tube.

7. In an outboard motor as defined in claim 6, said propulsion tube including tubular guide means at each end thereof for conveying water into the flow path of the combustion products as they discharge from the reversing tube in either direction for mixing the combustion products with water.

8. In an outboard motor as defined in claim 1, said said fuel injecting means including a fuel injector mounted above said combustion head and below the compressor, and cam means carried by said shaft for actuating said fuel injector to discharge fuel into the compressed air thereby forming a compressed fuel and air mixture above the combustion head.

References Cited by the Examiner

UNITED STATES PATENTS

| | | | |
|---|---|---|---|
| 368,678 | 8/1887 | McDougall. | |
| 1,229,729 | 6/1917 | Edinger | 60—35.54 |
| 1,255,852 | 2/1918 | Bengtson | 60—39.38 |
| 2,397,654 | 4/1946 | Forsyth | 115—13 |
| 2,431,132 | 11/1947 | Malina et al. | 115—13 |
| 2,543,024 | 2/1951 | Humphrey | 60—35.6 |
| 2,659,198 | 11/1953 | Cook | 60—39.76 X |

CARLTON R. CROYLE, *Primary Examiner.*